United States Patent
Roux et al.

[19]

[11] Patent Number: 6,022,406

[45] Date of Patent: Feb. 8, 2000

[54] METHOD FOR PREPARING INORGANIC PIGMENTS, RESULTING INORGANIC PIGMENTS, AND APPARATUS THEREFOR

[75] Inventors: Gilles Roux, St Quentin s/Isere; Farouk Tedjar, Grenoble, both of France

[73] Assignee: Recupac, Le Cheylas, France

[21] Appl. No.: 09/011,053

[22] PCT Filed: Jul. 30, 1996

[86] PCT No.: PCT/FR96/01202

§ 371 Date: May 27, 1998

§ 102(e) Date: May 27, 1998

[87] PCT Pub. No.: WO97/06215

PCT Pub. Date: Feb. 20, 1997

[30] Foreign Application Priority Data

Aug. 4, 1995 [FR] France .................................. 95 09548

[51] Int. Cl.⁷ .................................. C22B 7/02; C09C 1/00
[52] U.S. Cl. ...................... 106/419; 106/456; 106/459; 423/98; 423/99; 423/109; 423/138; 423/150.3; 422/139; 422/146; 422/171; 422/187; 422/188; 422/189
[58] Field of Search ................. 423/50, 50.3, 98, 423/109, 99, 138, 150.3; 106/419, 425, 426, 431, 432, 435, 454, 456, 457, 459, 466, 467, 480, 481, 482, 483; 422/171, 139, 187, 188, 189, 146

[56] References Cited

U.S. PATENT DOCUMENTS

| | | | |
|---|---|---|---|
| 4,124,462 | 11/1978 | Reinhardt et al. ................ | 205/605 |
| 4,940,487 | 7/1990 | Lugscheider et al. ............. | 75/384 |
| 5,188,658 | 2/1993 | Aune et al. ...................... | 75/10.31 |
| 5,278,111 | 1/1994 | Frame ............................. | 501/155 |
| 5,279,643 | 1/1994 | Kaneko et al. ................... | 75/499 |
| 5,364,441 | 11/1994 | Worner ........................... | 75/10.1 |
| 5,733,356 | 3/1998 | Konig et al. ..................... | 75/10.29 |

FOREIGN PATENT DOCUMENTS

| | | | |
|---|---|---|---|
| 3831838A1 | 3/1990 | Germany ........................ | B03B 9/04 |
| 1568362 | 5/1980 | United Kingdom ............ | C22B 19/24 |
| 1600022 | 10/1981 | United Kingdom ............ | C22B 19/24 |
| 89/04811 | 6/1989 | WIPO ............................. | C01F 7/26 |

*Primary Examiner*—C. Melissa Koslow
*Attorney, Agent, or Firm*—Young & Thompson

[57] ABSTRACT

A method for preparing inorganic pigments from steel mill dust, particularly electric steel mill dust, wherein (a) the dust is separated into a magnetic fraction and a non-magnetic fraction; (b) the non-magnetic fraction is subjected to a basic leaching reaction; (c) the resulting solid batch is rinsed until neutralized and then separated; (d) the resulting batch is calcined at 450–650° C.; (e) the calcined batch is treated with sulfuric acid in the presence of a catalyst; (f) the inorganic pigments are recovered; and (g) the solutions from (c) and (e) are used to precipitate other pigments.

25 Claims, 3 Drawing Sheets

METHOD FOR PREPARING INORGANIC PIGMENTS, RESULTING INORGANIC PIGMENTS, AND APPARATUS THEREFOR

FIELD OF THE INVENTION

The invention relates to a method of preparing inorganic pigments. More particularly, the invention relates to a method of preparing inorganic pigments by processing foundry dust, in particular from electrical steelworks. The invention also relates to inorganic pigments obtained thereby, and to an installation for implementing such a method.

A particular application of the method lies in processing foundry dust, and in particular dust from electrical steelworks.

BACKGROUND OF THE INVENTION

When steel is produced using an electric arc furnace, about 20 kg of dust is formed per (metric) tonne of steel produced.

This dust is the result of at least two reactions: in a first reaction, the more volatile metals pass into the vapor phase at the operating temperature of the furnace. When sucked into the air, they become oxidized, and they cool down, thus ending up either as free oxides, or else in the form of composite structures including iron oxides.

In a second reaction, fine particles of iron are dispersed in the vapor phase over the melt of boiling steel and are entrained by air suction. In the flow of air they cool down and under the action of oxygen in the air they are transformed into higher oxides. The interaction between such oxides and heavy metals can lead to the formation of compounds of the spinel type $MFe_2O_4$ (for M=Zn, Ni, Mn, or Cd). If M=Fe, then the phase is made of magnetite.

Dust from electrical steelworks thus contains varying quantities of majority elements such as iron, zinc, calcium, and silicon, in the form of single or multiple oxides, together with minority elements such as copper, manganese, chromium, cadmium, lead, and chlorides. The dust is considered as being toxic because heavy metals are salted out by leaching, so the dust is classified as class 1 waste. In this context, European regulations specify that from the year 2002, only waste that is known and confirmed as being "ultimate" will be accepted in class 1 dumps.

Two types of recycling method have been considered for processing dust from electrical steelworks.

A first type consists in performing reduction reactions at various temperatures depending on the particular method, to volatilize the heavy metals and reinject the ferrous fraction into the steel production furnaces.

Thus, document EP-A-336 923 (U.S. Pat. No. 4,940,487) proposes processing foundry dust in an iron smelting furnace after the dust has been transformed into pellets; document EP-A-441 052 (U.S. Pat. No. 5,188,658) proposes heat treatment in the range 1200° C. to 1700° C. while adding reducing agents. Document WO-A-91 12 210 (U.S. Pat. No. 5,364,441) describes a method of processing foundry dust in an iron smelting furnace, with the heavy metals being recovered by condensation from the hot gases; document EP-A-453 151 describes a method of processing dust in the form of pellets by using an agent that selectively reduces iron oxide; document FR-A-2 666 592 (U.S. Pat. No. 5,180,227) describes apparatus for extracting volatile metals by oxidation; document EP-A-3 193 describes an electric arc furnace specially designed for reducing dust that contains oxides; document EP-A-6 538 717 relates to a pyrometallurgical method associated with a step of distilling heavy metals in the liquid state; and document EP-A-551 992 (U.S. Pat. No. 5,279,643) describes a method of recovering recyclable metals from foundry dust by induction and volatization of the recyclable metals.

A second type of method consists in directing the dust to a use where it is rendered inert by various means for use as a building or filler material.

Thus, document EP-A-402 746 describes a recycling method in which foundry dust is integrated in clay to make a material for packing mines. Document WO-A-91 122 10 (U.S. Pat. No. 5,364,441) proposes using foundry dust for processing sewage with the addition of a flocculating agent.

Finally, document FR-A-2 689 881 (U.S. Pat. No. 5,278,111) describes a method of manufacturing bricks having properties that are improved by adding electrical steelworks dust that has previously been calcined at the volatilization temperature of the heavy metals contained in said duct.

OBJECTS OF THE INVENTION

A first object of the present invention is to propose a method of preparing inorganic pigments from foundry dust, in particular from electrical steelworks.

Another object of the present invention is to propose such a method that makes it possible not to only to recycle the most abundant fraction of foundry dust, but also to neutralize the free heavy metals contained in said dust.

Another object of the present invention is to propose such a method that makes it possible to process both so-called "acid" dust and so-called "basic" dust.

Another object of the present invention is to propose such a method making it possible to isolate zinc ferrite from foundry dust to enable it to be used as a pigment of a shade analogous to that obtained using zinc ferrite, on its own or associated with other iron oxides.

SUMMARY OF THE INVENTION

To this end, the invention provides a method of preparing inorganic pigments, in which the raw material used is foundry dust, in particular from electrical steelworks.

More particularly, the invention provides a method of preparing inorganic pigments from foundry dust, in particular from electrical steelworks, the method being characterized in that it comprises the following steps:

a) the dust is separated into two fractions, a fraction comprising magnetic elements and a fraction comprising non-magnetic elements;

b) said non-magnetic fraction is subjected to a basic leaching reaction to dissolve the fraction of zinc that is not bound in the form of spinel, the silica, the lead, and a fraction of the manganese;

c) the resulting solid material is rinsed to neutrality and is separated out;

d) the resulting material is calcined at a temperature lying in the range 450° C. to 650° C.;

e) the calcined material is processed in sulfuric acid in the presence of a catalyst for dissolving iron oxides formed during the calcination step and heavy metals other than zinc;

f) the inorganic pigments are recovered; and g) the solutions from c) and e) are used to precipitate other pigments.

According to the invention, the dust is separated into two fractions, a magnetic fraction and a non-magnetic fraction, by:

subjecting the dust to attrition in water;

hydraulically classifying the resulting material; and subjecting the finer fraction of the hydraulically classified material to magnetic separation while wet.

The method of the invention for preparing inorganic pigments also has the following characteristics taken on their own, in combination, or optionally: the material from the step of attrition in water is hydraulically classified by means of a hydrocyclone; the fraction subjected to magnetic separation while wet corresponds to a grain size greater than about 40 micrometers; the basic leaching reaction is performed in the presence of a redox agent; the redox agent is selected from the group constituted by compounds that are oxidizing in an alkaline medium; the redox agent is hydrogen peroxide; step c) is performed by means of a horizontal separator; the calcination step is performed in a fluidized bed furnace associated with a disintegrator; the catalyst used in the step of sulfuric acid processing is an oxydoreduction compound; the oxydoreduction compound is selected from the group constituted by derivatives of hydrazinium or of hydroxylamine chlorohydrate; and the oxydoreduction compound is hydrazine sulfate.

The invention also provides inorganic pigments characterized in that they are obtained by implementing the method of the present invention.

Such inorganic pigments are suitable for use in particular as pigments to provide color or as additives for anticorrosion paint.

The invention also provides an installation for implementing a method of preparing inorganic pigments, characterized in that it comprises from upstream to downstream and starting from a feed of foundry dust, in particular from an electrical steelworks:

a first set of stations for separating the dust into two fractions, a fraction comprising magnetic elements and a fraction comprising non-magnetic elements;

a second set of stations enabling said non-magnetic fraction to be subjected to a basic leaching reaction in order to obtain a washed sludge;

a third set of stations enabling the washed sludge to be calcined, leading to a first pigment fraction;

a fourth set of stations enabling the washed sludge to be processed in acid after calcination in order to obtain a liquid solution; and a fifth set of stations enabling the liquid solution to be processed to obtain a second fraction of inorganic pigments.

The first set of stations comprises from upstream to downstream at least one attrition cell fed with dust and delivering a slurry to at least one dilution vessel; at least one hydraulic classification station whose overflow is processed in at least one magnetic separator while wet; and at least one centrifuge for separating the elements of the non-magnetic fraction to obtain a liquid and a sludge.

In a preferred embodiment, the installation of the present invention comprises two attrition cells operating in parallel.

The hydraulic classification station is a hydrocyclone.

The installation of the present invention comprises, downstream from the centrifuge, a series of ion exchange resins for processing the liquid.

The installation of the invention comprises at least one in-line analysis station for evaluating the following ratios Ca+Mg/Si and Fe/Zn.

The second set of stations comprises from upstream to downstream at least one leaching reactor for the sludge; at least one centrifuge for separating a liquid and a sludge; and at least one washing vessel for washing the sludge to obtain a washed sludge.

The installation of the invention further comprises, downstream from the centrifuge at least one reactor for processing the liquid with lime; at least one reactor for processing the liquid fraction from the reactor after reaction and filtering with zinc powder; and at least one buffer tank for receiving the purified solution coming from the reactor after reaction and filtering.

It further comprises, downstream from the buffer tank an electrolyzer.

The third set of stations comprises at least a fluidized bed calcination furnace for the washed sludge.

The fourth set of stations comprises at least one reactor for processing the washed sludge after calcination with acid; and at least one centrifuge for separating a liquid solution that is stored in at least one buffer tank from a sludge.

The fifth set of stations comprises at least one reactor for neutralizing the liquid solution stored in the buffer vessel by using the solution stored in the buffer tank, and at least one drying station for drying the solid fraction coming from the reactor.

BRIEF DESCRIPTION OF THE DRAWINGS

The invention also has the following characteristics taken in combination with those described above, and made with reference to the accompanying drawings, in which.

DETAILED DESCRIPTION OF THE INVENTION

Figure 1:
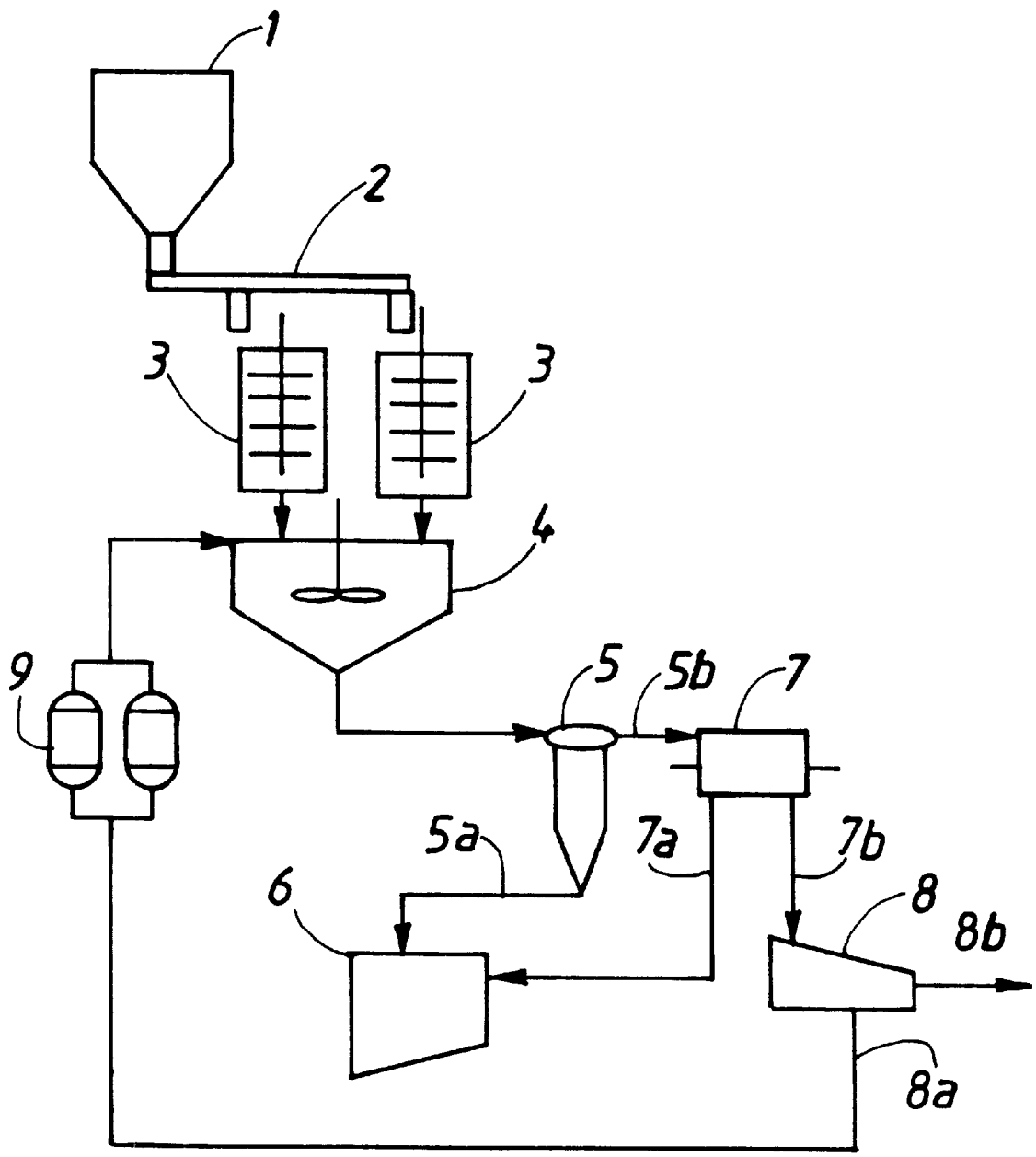
FIG. 1 is a diagram of a first set of stations in an installation of the present invention.
Figure 2:
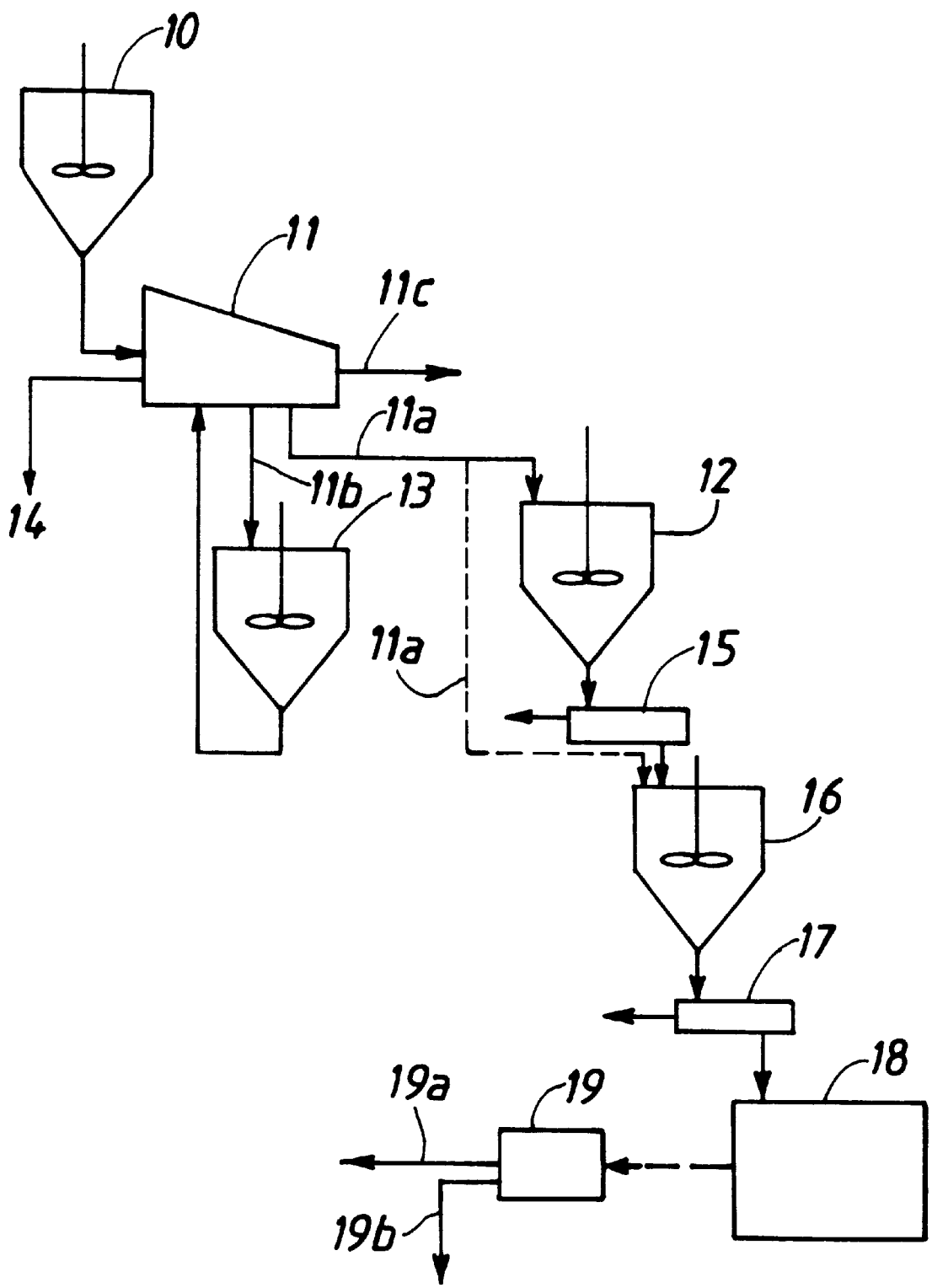
FIG. 2 is a diagram of a second set of stations in an installation of the present invention, and situated downstream from the first set.
Figure 3:
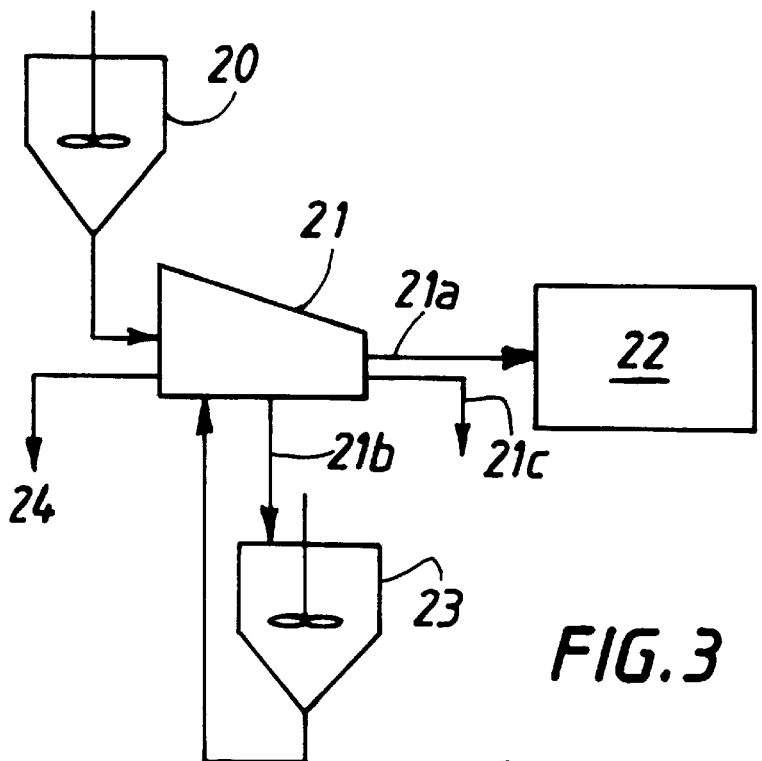
FIG. 3 is a diagram of a third set of stations in an installation of the present invention, and situated downstream from the second set.
Figure 4:
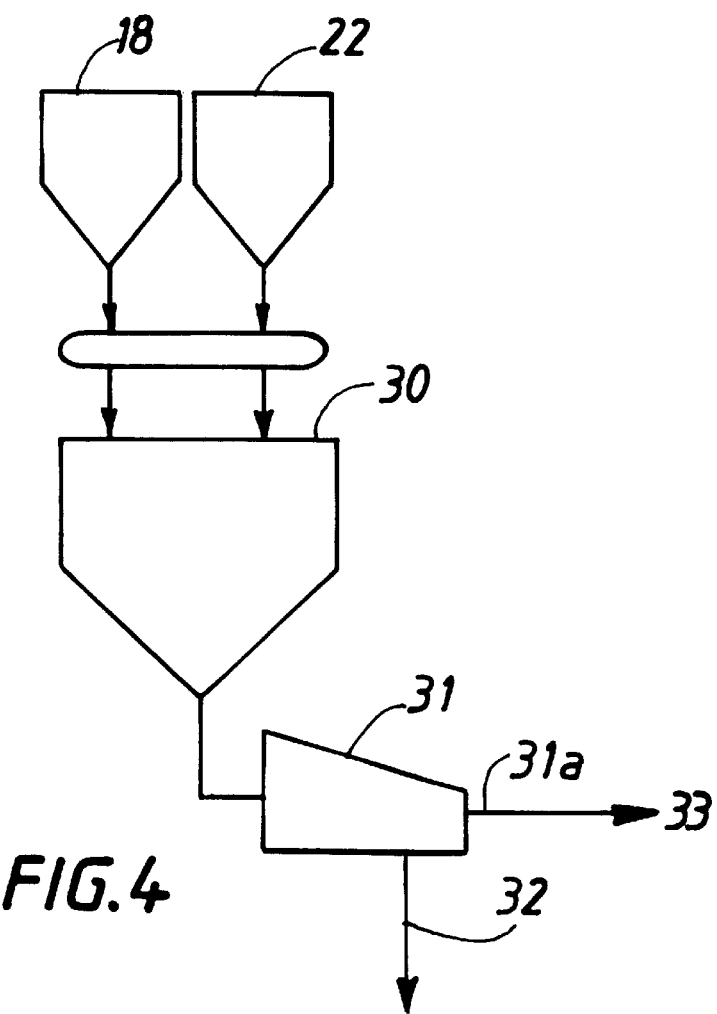
FIG. 4 is a diagram of the fifth set of stations in an installation of the present invention, this set being situated downstream from the fourth set.

The present invention thus provides a method of preparing inorganic pigments in which the raw material used is foundry dust, in particular from electrical steelworks.

The composition of the dust depends on the nature of the steelworking method. Although concentrations of iron and zinc are relatively similar from one works to another, the acid-basic nature varies greatly as demonstrated by the lime, magnesia, and silica contents. In outline, different dusts can be categorized by the ratio R=lime+magnesia/silica. The composition and the value of R for four different kinds of dust are given in the following table:

| Works | Zinc | Iron | CaO + MgO | Silica | R |
|---|---|---|---|---|---|
| 1 | 29 | 21 | 4 | 3 | 1.33 |
| 2 | 19 | 22 | 12 | 6 | 2 |
| 3 | 17 | 23 | 15 | 3 | 5 |
| 4 | 13 | 46 | 0.3 | 17 | 0.017 |

Scanning electronic microscope analysis, together with spot analysis by energy dispersion, shows that the dust is the result of a physical agglomeration mechanism and of complex chemical interactions. X-ray diffraction analysis on powder shows that the spectrum is very similar to that of a well-defined phase of the ferrite type, which crystallizes into a spinel lattice. Since zinc is a majority element together with iron, the compound is entirely suitable for labelling as a zinc ferrite: $ZnFe_2O_4$ (franklinite).

This type of ferrite is used as a base material for applications in the form of pigment. The temperature stability of zinc ferrites makes them preferable to mixtures of iron oxides that have temperature stability which is less good.

In the process whereby foundry dust is formed, the presence of ferrite is due to the interaction $ZnO$—$Fe_2O_3$, at temperatures that are often higher than 1000° C.

Depending on the process used, zinc ferrite is obtained:
either by calcination of zinc and iron oxides at temperatures lying in the range 750° C. to 1000° C.;
or else by coprecipitation of iron and zinc hydroxides followed by calcination at temperatures lying in the range 750° C. to 1000° C., and sometimes as much as 1250° C.

Also, dust from electrical steelworks has a very wide range of grain sizes, comprising fractions over the range 1 $\mu$m to 150 $\mu$m. The particles exhibit a very high tendency to agglomerate. This property excludes any possibility of dry screening (even when screening is assisted by ultrasound, it turns out to be unsuccessful).

Studying the grain sizes of dust from electrical steelworks shows that the chemical compositions of the fractions depend strongly on grain size. Thus, the fractions of largest grain size are the richest in iron metal. Since the dust particles are also the result of particles of smaller size physically agglomerating around a larger central grain, only attrition in water serves to break up the agglomerates. This advantageously facilities separating the material into two fractions (greater than and less than about 40 micrometers, for example).

Thus, in the method of the present invention, the dust is initially subjected to attrition in water and then to hydraulic classification, in particular by means of a hydrocyclone. After hydraulic classification, the material is subjected to magnetic separation while in liquid. This separation makes it possible to recover ferromagnetic fractions, and in particular microparticles and beads of steel that have been volatilized in the furnace. It also serves to rinse the material to finish off eliminating soluble salts such as chlorides.

The material of grain size less than about 40 micrometers is then processed by a solution of concentrated sodium hydroxide with lime, in the presence of a redox agent which is advantageously selected from the group constituted by compounds that are oxidizing in an alkaline medium. Of these compounds, hydrogen peroxide is particularly preferred because it is makes it possible to avoid contaminating the environment. Water and oxygen are then the only products obtained after reacting $H_2O_2$. This step of the method of the invention makes it possible to dissolve firstly the zinc fraction that is not bound in the form of spinel, and secondly the silica, the lead, and a fraction of the manganese.

After this first chemical process, the material is rinsed until it has been neutralized and is separated, in particular by means of a horizontal separator.

The solid is then calcined at a temperature lying in the range 400° C. to 650° C. in a fluidized bed furnace capable of being fed with sludge, and giving rise to calcined material that it delivers in the form of powder. This avoids the need for expensive grinding.

The calcined material is then processed using sulfuric acid at medium concentration and in the presence of an oxydoreduction compound which acts as a catalyst for dissolving the iron oxides formed during calcination and the heavy metals other than zinc. The catalyst is selected from hydrazinium derivatives or hydroxylamine chlorohydrate because of the low redox potential of those compounds. Hydrazine sulfate is preferred because of the sulfate medium. The only products obtained after oxidation are then sulfuric acid and nitrogen using the following reaction:

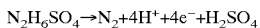
$N_2H_6SO_4 \rightarrow N_2 + 4H^+ + 4e^- + H_2SO_4$

The invention is now described with reference more particularly to the figures which show an installation of the present invention.

The installation essentially comprises five sets of stations, referred to below as sets A, B, C, D, and E.

Set A: dust stored in a silo 1 is conveyed by an Archimedes' screw 2 into at least one attrition cell 3. Preferably, the installation of the present invention has two attrition cells 3 operating in parallel. After attrition, the slurry is delivered to a vessel 4 fitted with a water inlet and in which the density of the slurry is lowered by being diluted. The material is then delivered under pressure to a hydrocyclone 5. The underflow 5a goes to a settling tank 6 and the overflow 5b is processed while wet in a magnetic separator. The magnetic fraction 7a is directed to the settling tank 6 while the non-magnetic elements 7b are separated by means of a horizontal centrifuge 8. The clarified fluid 8a is processed on a series of iron-exchange resins 9 and is recycled via the dilution vessel 4. The sludge 8b is subjected to in-line analysis to evaluate the ratio Ca+Mg/Si and also the ratio Fe/Zn. The following step depends on the values of these parameters. Depending on whether the sludge 8b is acid or basic, it is conveyed respectively to set B1 or B2.

Set B1: the sludge 8b obtained at the outlet from set A is placed in a reactor 10 that is heated, stirred, and contains the sodium hydroxide solution together with the redox agent. At the end of the basic leaching reaction, the slurry is applied to a centrifuge 11. After separation, the clarified fluid or leaching liquor 11a is applied to a second reactor 12, while the sludge 11b is applied to a washing vessel 13 provided with stirring, pH regulation, and an inlet for aciduous water. After the washing cycle, the slurry having a pH lying in the range 7 to 8.5 is separated at 11. The washed and separated sludge 11c is retained for being subjected to the processing implemented in the set C, while the washing solution is delivered to a storage reservoir 14. In the reactor 12, the basic leaching liquid 11a is processed with lime to precipitate the silica in the form of calcium silicate which is filtered at 15 after washing. The clarified fraction is then processed in the reactor 16 with zinc powder to cement the lead, the copper, and the nickel. The cements are recovered after washing in filter 17, and the purified solution is stored in a buffer tank 18. This solution is for applying to set E.

The sequence of steps described above are applied to dust that is acid, whereas the following of steps is applied to foundry dust that is basic.

Set B2: the sludge 8b obtained at the outlet from set A is applied to a reactor 10 that is stirred and heated and that contains the sodium hydroxide solution together with the redox agent. At the end of the basic leaching reaction, the slurry is applied to a centrifuge 11. After separation, the clarified fluid or leaching liquor 11a is applied to a second reactor 16 while the sludge 11b is applied to a washing vessel 13 having stirring, pH regulation, and an inlet for aciduous water. After the washing cycle, the slurry has a pH in the range 7 to 8.5 and is separated at 11. The washed and separated sludge 11c is retained to be subjected to the processing of set C, while the washing solution is applied to a storage tank 14. In the reactor 16, the basic leaching liquor 11a is processed using zinc powder to cement the lead, the copper, and the nickel. The cements are recovered after washing in filter 17 and the purified solution is stored in a buffer tank 18. This tank serves to apply a continuous feed to an electrolyzer 19 whose electrodes are made of stainless steel. The outlet liquor passes via a bag filter to recover the zinc 19a present in the form of a spongy powder. The liquid solution 19b is applied to the beginning of the method to serve again for basic reaction, after its titer has been readjusted.

Set C (not shown): the sludge 11c from process B is applied to a fluidized bed calcination furnace fitted with a classification cyclone and with fines being drawn off, and fitted with apparatus for recirculating coarse particles via a disintegrator.

Set D: after calcination, the sludge 11c is mixed with an acid solution comprising the catalyst in a reactor 20 provided with stirring and regulated heating. At the end of the reaction time, the slurry is delivered to a centrifuge 21. The clarified solution 21a is stored in a buffer vessel 22 and the sludge 21b is delivered to a washing vessel 23 provided with stirring, pH regularization, and an inlet for alkaline water. After rinsing, the solid material 21c is delivered to step E, while the rinsing solution is sent to a storage reservoir 24.

Set E: in this step, the processing is performed in a reactor 30 provided with stirring, pH regulation, and a strip for injecting bubbling air. The reactor 30 is filled with the clarified solution 21a from step C as stored in buffer vessel 22. It is put to the desired pH by means of the alkaline solution coming from step B and stored in buffer 18. At the end of the precipitation reaction, the solid fraction is dried at 31 to give the pigments 32, while the solution 31a is delivered to a block 33 for processing effluent.

To process the effluent, the rinsing solutions from steps B and C as stored respectively in storage reservoirs 14 and 24, and also the solution 31a coming from step E, are used for self-neutralization in a settling tank provided with pH regulation. The neutral solution passes through an ion exchange resin column to eliminate residual heavy metals. The permeate is then treated in an electrodialysis cell having a bipolar membrane to regenerate the acid and the base from the saline solution. Depending on the salt concentration, the solution may advantageously be concentrated by reverse osmosis before being subjected to electrolysis using a single cationic membrane for regenerating both the concentrated sodium hydroxide and a solution of conjugate salt and acid. The concentrated sodium hydroxide is thus regenerated and can advantageously be reused in set B.

The invention is described below by means of non-limiting examples.

EXAMPLE 1

Acid Dust 500 grams (g) of dust were subjected to attrition for 15 min in 250 milliliters (ml) of water. After attrition, the material was diluted with 2.5 liters (l) of water and subjected to hydraulic classification. 14% of the material constituted residue at 42 microns. The overflow (finest fraction) was subjected to low intensity magnetic separation. With a field of 1500 gauss and a rinse water flow rate of 12 l/min, the magnetic fraction represented 5% of the material. After attrition, the composition of the non-magnetic material was: Fe 41.5%, Zn 11.04%, Pb 0.4%, Mn 2.6%, Si 16.68%.

200 g of the non-magnetic material were subjected to basic leaching using sodium hydroxide at 30% by weight in the presence of $H_2O_2$ at 90° C. for 4 hours. After filtering, the solid fraction was washed to neutralization and then dried at 100° C.: 168.5 g were recovered. Its composition was Fe 46.9%, Zn 14.6%. After alkaline treatment, the material was calcined at 400° C. for 4 hours: 149.5 g were recovered and then processed in sulfuric acid at 10% for 2 hours at 50° C. in the presence of a catalyst for reducing iron (III). 116.9 g were finally obtained. The aluminum and phosphorus initially contained in the dust had a beneficial effect on the color of the final product, particularly for use as a lightening agent. The resulting powder was rinsed abundantly in water and then dried at 100° C. The illuminant degree of the sample obtained was $L^*=40.7$, $a^*=17.07$, and $b^*=29.02$.

1.5 liters of alkaline processing liquor were treated with 15 g of lime under stirring at 60° C. for 20 min. After settling, the precipitate constituted by calcium silicate was separated and the liquid was then processed with zinc powder under stirring to cement the lead and the copper. The final solution contained 9.3 g of zinc in the form of sodium zincate. 2.3 liters of acid liquor were processed with zinc powder to cement the copper and the nickel. After that processing, the solution contained 7 g of zinc, 1.2 g of manganese, and 15 g of iron. The solution was partially neutralized at 60° C. to a pH of 5.2 while bubbling air at 1500 l/h. The resulting precipitate was washed and dried at 250° C. in a circulating air dryer.

EXAMPLE 2

Basic Dust 500 g of dust were processed as in Example 1 up to the step of basic leaching. 200 g of the non-magnetic material were subjected to basic leaching using 30% by weight sodium hydroxide at 90° C. for 4 hours. After filtering, the solid fraction was washed to neutralization. The resulting liquor was processed with zinc powder to cement the lead, and then subjected to continuous electrolysis in a cell having stainless steel electrodes (e.g. made of "hastelloy", registered trademark). The liquor poor in zinc ions was reused for the basic reaction. The solids were subjected to acid reaction under the same conditions as in Example 1, but to a more advanced degree and in the presence of the same catalyst for reducing iron (III). At the end of the reaction, the insoluble fraction contained essentially silica, together with calcium and magnesium silicates and sulfates.

After the precipitate had been separated, the solution was kept at 70° C. with air bubbling through. A sodium hydroxide solution was added to a pH of 5.2 to precipitate a yellow iron oxyhydroxide. The final product was separated, washed, and calcined at 250° C.

What is claimed is:

1. A method of preparing zinc ferrite containing inorganic pigments from foundry dust, the method comprising the following steps:
    a) separating the dust into two fractions, a fraction comprising magnetic elements and a fraction comprising non-magnetic elements;
    b) subjecting the non-magnetic fraction to a basic leaching reaction to dissolve a fraction of zinc that is not bound in the form of spinel, silica, lead, and a fraction of manganese;
    c) rinsing the resulting solid material to neutrality, and separating it out;
    d) calcining the resulting material at a temperature lying in the range of 450° C. to 650° C.;

e) processing the calcined material in sulfuric acid in the presence of a catalyst, the catalyst dissolving iron oxides formed during the calcination step and heavy metals other than zinc; and f) recovering inorganic pigments.

2. The method of preparing inorganic pigments according to claim 1, wherein the dust is separated into two fractions, a magnetic fraction and a non-magnetic fraction, by:

subjecting the dust to attrition in water;

hydraulically classifying the resulting material; and subjecting the finer fraction of the hydraulically classified material to magnetic separation while wet.

3. The method of preparing inorganic pigments according to claim 1, wherein the material from the step of attrition in water is hydraulically classified in a hydrocyclone.

4. The method of preparing inorganic pigments according to claim 1, wherein the finer fraction subjected to magnetic separation while wet has a grain size greater than about 40 micrometers.

5. The method of preparing inorganic pigments according to claim 1, wherein the basic leaching reaction is performed in the presence of a redox agent.

6. The method of preparing inorganic pigments according to claim 5, wherein the redox agent is selected from compounds that are oxidizing in an alkaline medium.

7. The method of preparing inorganic pigments according to claim 5, wherein the redox agent is hydrogen peroxide.

8. The method of preparing inorganic pigments according to claim 1, wherein the separation in step c) is performed in a horizontal separator.

9. The method of preparing inorganic pigments according to claim 1, wherein the calcination step is performed in a fluidized bed furnace associated with a disintegrator.

10. The method of preparing inorganic pigments according to claim 1, wherein the catalyst used in the step of sulfuric acid processing is an oxydoreduction compound.

11. The method of preparing inorganic pigments according to claim 10, wherein the oxydoreduction compound is selected from the group consisting of derivatives of hydrazinium or of hydroxylamine chlorohydrate.

12. The method of preparing inorganic pigments according to claim 10, wherein the oxydoreduction compound is hydrazine sulfate.

13. The method of preparing inorganic pigments according to claim 1, wherein the dust is obtained from electrical steelworks.

14. An installation for preparing inorganic pigments from foundry dust, comprising from upstream to downstream and starting from a feed of foundry dust:

a first set of stations for separating the dust into two fractions, a fraction comprising magnetic elements and a fraction comprising non-magnetic elements;

a second set of stations enabling said non-magnetic fraction to be subjected to a basic leaching reaction in order to obtain a washed sludge;

a third set of stations enabling the washed sludge to be calcined, leading to a first pigment fraction;

a fourth set of stations enabling the washed sludge to be processed in acid after calcination in order to obtain a liquid solution; and a fifth set of stations enabling the liquid solution to be processed to obtain a second fraction of inorganic pigments.

15. The installation according to claim 14, wherein the first set of stations comprises from upstream to downstream at least one attrition cell fed with dust and delivering a slurry to at least one dilution vessel; at least one hydraulic classification station whose overflow is processed in at least one magnetic separator while wet; and at least one centrifuge for separating the elements of the non-magnetic fraction to obtain a liquid and a sludge.

16. The installation according to claim 15, wherein said at least one attrition cell comprises two attrition cells operating in parallel.

17. The installation according to claim 15, wherein the hydraulic classification station is a hydrocyclone.

18. The installation according to claim 15, further comprising, downstream from the centrifuge, a series of ion exchange resins for processing the liquid.

19. The installation according to claim 14, further comprising at least one in-line analysis station for evaluating the following ratios (Ca+Mg)/Si and Fe/Zn.

20. The installation according to claim 14, wherein the second set of stations comprises from upstream to downstream at least one leaching reactor for the sludge; at least one centrifuge for separating a liquid and a sludge; and at least one washing vessel for washing the sludge to obtain a washed sludge.

21. The installation according to claim 16, further comprising, downstream from the centrifuge at least one first reactor for processing the liquid with lime; at least one second reactor for processing the liquid fraction from the first reactor after reaction and filtering with zinc powder; and at least one first buffer tank for receiving the purified solution coming from the second reactor after reaction and filtering.

22. The installation according to claim 21, further comprising, downstream from the first buffer tank an electrolyzer.

23. The installation according to claim 14, wherein the third set of stations comprises at least a fluidized bed calcination furnace for the washed sludge.

24. The installation according to claim 14, wherein the fourth set of stations comprises at least one reactor for processing the first pigment fraction with acid; and at least one centrifuge for separating a liquid solution that is stored in at least one second buffer tank from a sludge.

25. The installation according to claim 21, wherein the fourth set of stations comprises at least one reactor for processing the first pigment fraction with acid and at least one centrifuge for separating a liquid solution that is stored in at least one second buffer tank from a sludge; and wherein the fifth set of stations comprises at least one neutralization reactor for neutralizing the liquid solution stored in the second buffer tank by using the solution stored in the first buffer tank; and at least one drying station for drying a solid fraction coming from the neutralization reactor.

* * * * *